(12) United States Patent
    Pate

(10) Patent No.: US 8,101,887 B2
(45) Date of Patent: Jan. 24, 2012

(54) HEATED STEERING WHEEL COVER

(76) Inventor: Rodger M. Pate, McAlester, OK (US)

( * ) Notice: Subject to any disclaimer, the term of this patent is extended or adjusted under 35 U.S.C. 154(b) by 450 days.

(21) Appl. No.: 12/320,736

(22) Filed: Feb. 3, 2009

(65) Prior Publication Data
US 2010/0193495 A1    Aug. 5, 2010

(51) Int. Cl.
    *B62D 1/06* (2006.01)
    *H05B 1/00* (2006.01)
(52) U.S. Cl. .................. 219/204; 219/202; 219/528
(58) Field of Classification Search ............ 219/204
    See application file for complete search history.

(56) References Cited

U.S. PATENT DOCUMENTS

| | | |
|---|---|---|
| 1,345,249 A | 6/1920 | Rohne |
| 1,429,397 A | 9/1922 | Barrow |
| 1,429,799 A | 9/1922 | Tesdell |
| 2,392,539 A | 1/1946 | Leible |
| 2,530,559 A | 11/1950 | Wilson |
| 2,662,961 A | 12/1953 | Sargent |
| 3,165,620 A | 1/1965 | Miller |
| 4,535,221 A | 8/1985 | Holsworth |
| 4,547,655 A | 10/1985 | Kurata et al. |
| 4,549,069 A | 10/1985 | Oge |
| 4,631,976 A | 12/1986 | Noda et al. |
| 5,294,775 A | 3/1994 | Carrier |
| 5,761,968 A | 6/1998 | Poteet |
| 5,847,360 A | 12/1998 | Lorenzen et al. |
| 6,172,342 B1 | 1/2001 | Khafagy et al. |
| 6,239,409 B1 | 5/2001 | Bonn et al. |
| 6,268,588 B1 | 7/2001 | Hazebrouck et al. |
| 6,326,593 B1 | 12/2001 | Bonn et al. |
| 6,414,270 B1 | 7/2002 | Sugiyama et al. |
| 6,512,202 B2 | 1/2003 | Haag et al. |
| 6,762,394 B2 | 7/2004 | Hobby |
| 6,956,564 B1 * | 10/2005 | Williams ............ 345/179 |
| 7,045,743 B2 | 5/2006 | Park |
| 7,145,102 B2 | 12/2006 | Hadzizukic et al. |
| 7,378,615 B1 | 5/2008 | King |
| 2006/0118538 A1 | 6/2006 | Jones et al. |
| 2008/0083079 A1 * | 4/2008 | Starrette ............ 15/97.1 |

FOREIGN PATENT DOCUMENTS

CN    2003/8108687    12/2003

OTHER PUBLICATIONS

Heated Steering Wheel Cover, 2 pages printed from the Internet Sep. 25, 2008 http://www.nnice.com.cn/products.asp?theparent=30.

* cited by examiner

*Primary Examiner* — Joseph M Pelham
*Assistant Examiner* — Diallo I Duniver
(74) *Attorney, Agent, or Firm* — Richard C. Litman

(57) ABSTRACT

The heated steering wheel cover includes a resilient, flexible, substantially annular member having an open bottom portion enabling the substantially annular member to be removably fitted over a vehicle's steering wheel. A heating element is disposed inside of the steering wheel cover. A battery pack is electrically connected to the heating element. A switch is electrically connected to the battery pack and selectively turns the heating element on or off. The battery pack is removably attachable to a portion of the vehicle proximate the steering wheel so that safe operation of the heating element is possible while the vehicle is being driven.

3 Claims, 4 Drawing Sheets

HEATED STEERING WHEEL COVER

BACKGROUND OF THE INVENTION

1. Field of the Invention

The present invention relates to steering wheel covers and more particularly pertains to a heated steering wheel cover that warms a user's hands while the user is operating the steering wheel during cold weather.

2. Description of the Related Art

In cold weather, a vehicle's interior surfaces are cold when the vehicle is first started and for some time afterwards. A cold steering wheel causes discomfort to the driver. This discomfort may prove distracting and impair the driver's ability to give his full attention to safely operating the vehicle.

A heated steering wheel partly addresses this problem. Although a heated steering wheel is available in some high-end vehicles, heated steering wheels are not inexpensive and are not widely available for all vehicles.

Further, these heated steering wheels may be activated by a console-mounted switch, which the vehicle driver toggles to begin the steering wheel heating. These switches may result in the steering wheel being hot even when not in use, and the heating not beginning until the occupant remembers to toggle the on/off switch. This may result in other safety problems and delay in heating the driver's hands when placed on the steering wheel.

Additionally, a heated steering wheel is not transportable. That is to say, each vehicle must have its own heated steering wheel. It would be desirable to have a removable heated steering wheel cover that functions while the driver's hands are on the steering wheel and that can be easily transported to another vehicle wherever needed.

Thus, a heated steering wheel cover solving the aforementioned problems is desired.

SUMMARY OF THE INVENTION

The heated steering wheel cover includes a resilient, flexible, substantially annular member having an open bottom portion enabling the substantially annular member to be removably fitted over a vehicle's steering wheel. A heating element is disposed inside of the steering wheel cover. A battery pack is electrically connected to the heating element. Switching means is operably connected to the battery pack and selectively turns the heating element on or off. The battery pack is removably attachable to a portion of the vehicle proximate the steering wheel and thus safe operation of the heating element is possible while the vehicle is being driven.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
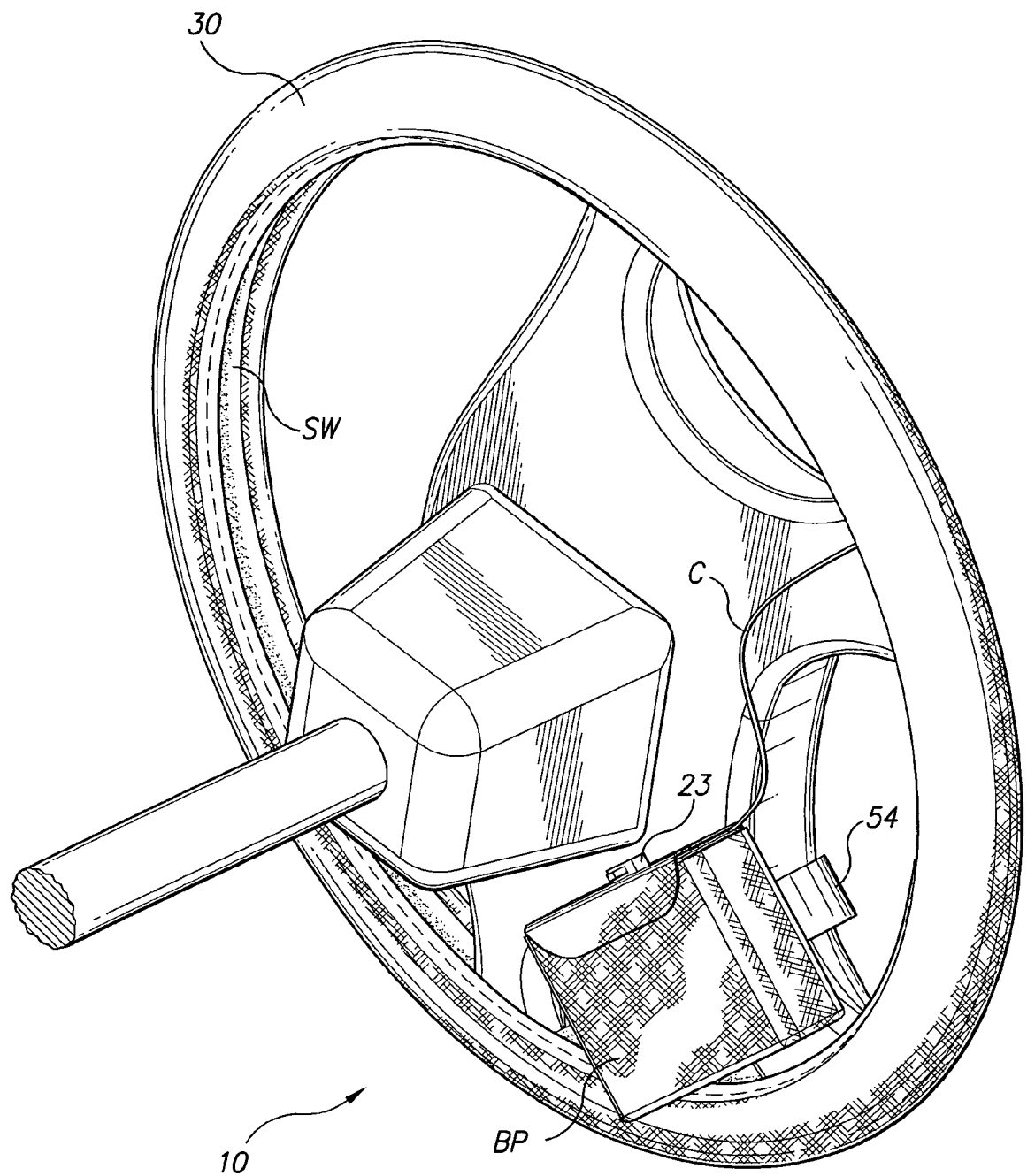
FIG. 1 is an environmental, perspective view of a heated steering wheel cover according to the present invention.

As shown in FIGS. 1-5, the heated steering wheel cover 10 includes a resilient, flexible, substantially annular member having an open bottom portion enabling the substantially annular member to be removably fitted over a vehicle's steering wheel. Flexible, elastic cloth (or similar material such as a flexible, elastic polymeric compound, e.g. neoprene, or the like) forms exterior layer 30 of the wheel cover 10.

A heating element 21 is disposed beneath the exterior layer 30 of the steering wheel cover 10. The heating element 21 is arranged in a lateral zigzag, i.e., serpentine pattern that extends beneath substantially the entire circumference of exterior layer 30. An interior layer 40 is made of cloth and is sewn to lateral edges of exterior layer 30 thereby sealing heating element 21 in place between the exterior layer 30 and interior layer 40. The exterior layer 30 is selected to readily transfer heat from the heating element 21 to the driver, while at the same time offering the driver a good gripping surface. Moreover, the exterior layer 30 is selected to protect the driver from skin contact with heating element 21.

A battery pack BP is electrically connected to the heating element 21 via electric cable C. In the most elementary form of heated steering wheel cover 10, a single switch 23 is operably connected to the battery pack and selectively turns the heating element on or off based on user setting of the switch position. The battery pack BP is removably attachable to a portion of the vehicle proximate the steering wheel SW thus providing safe operation of the heating element 21 while the vehicle is being driven.

Figure 2:
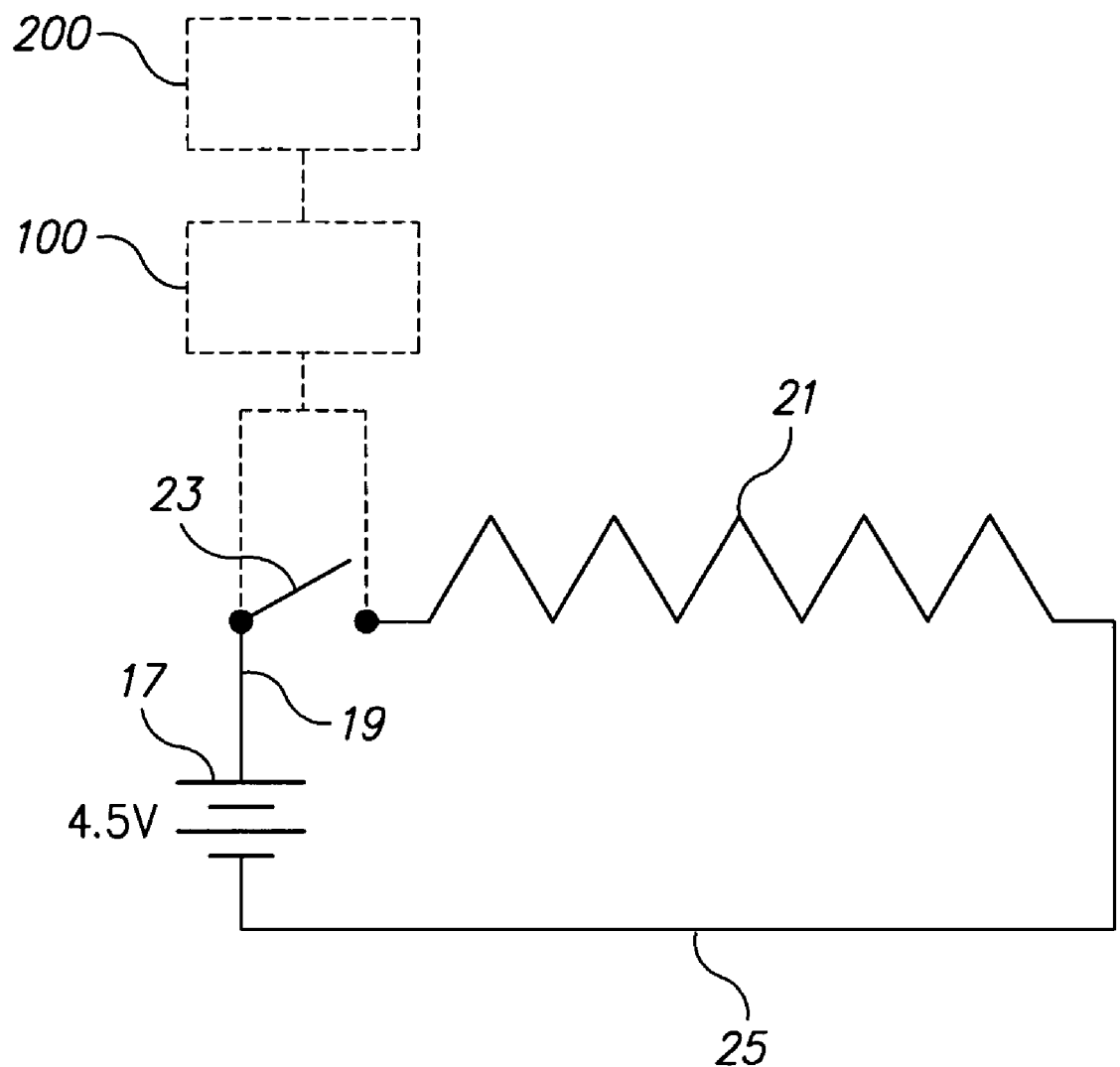
FIG. 2 is a diagrammatic view showing the electrical connection of a heated steering wheel cover according to the present invention.
Figure 3:
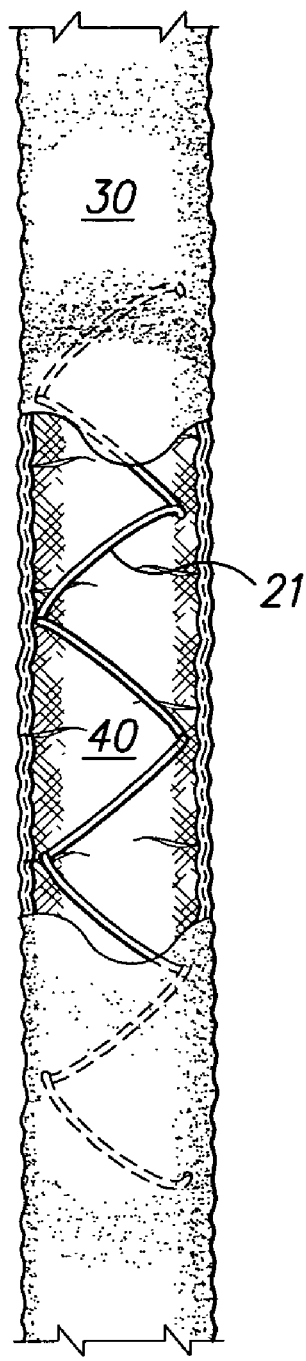
FIG. 3 is a partial top view of an outside portion of the heated steering wheel cover according to the present invention, broken away to show the serpentine layout heating element.
Figure 4:
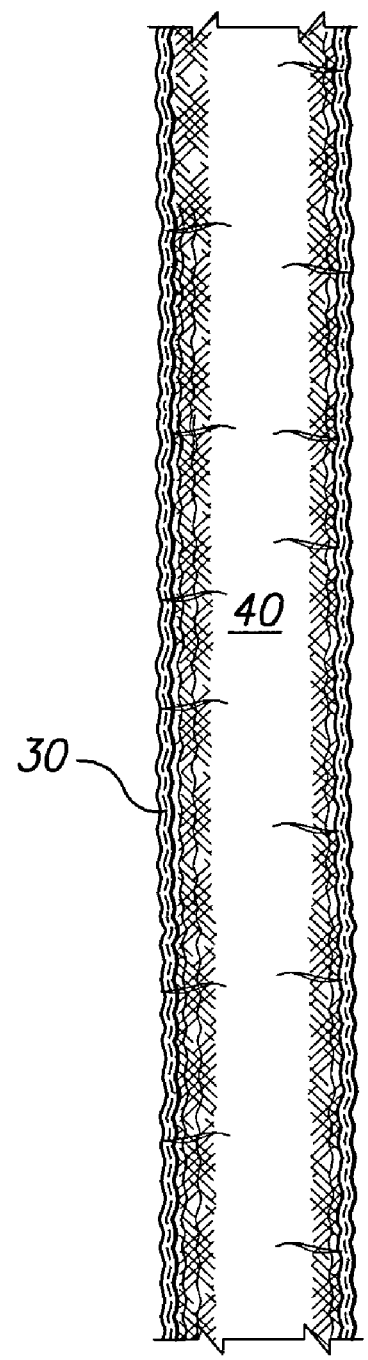
FIG. 4 is a partial bottom view of the heated steering wheel cover according to the present invention, showing the interior of the cover.
Figure 5:
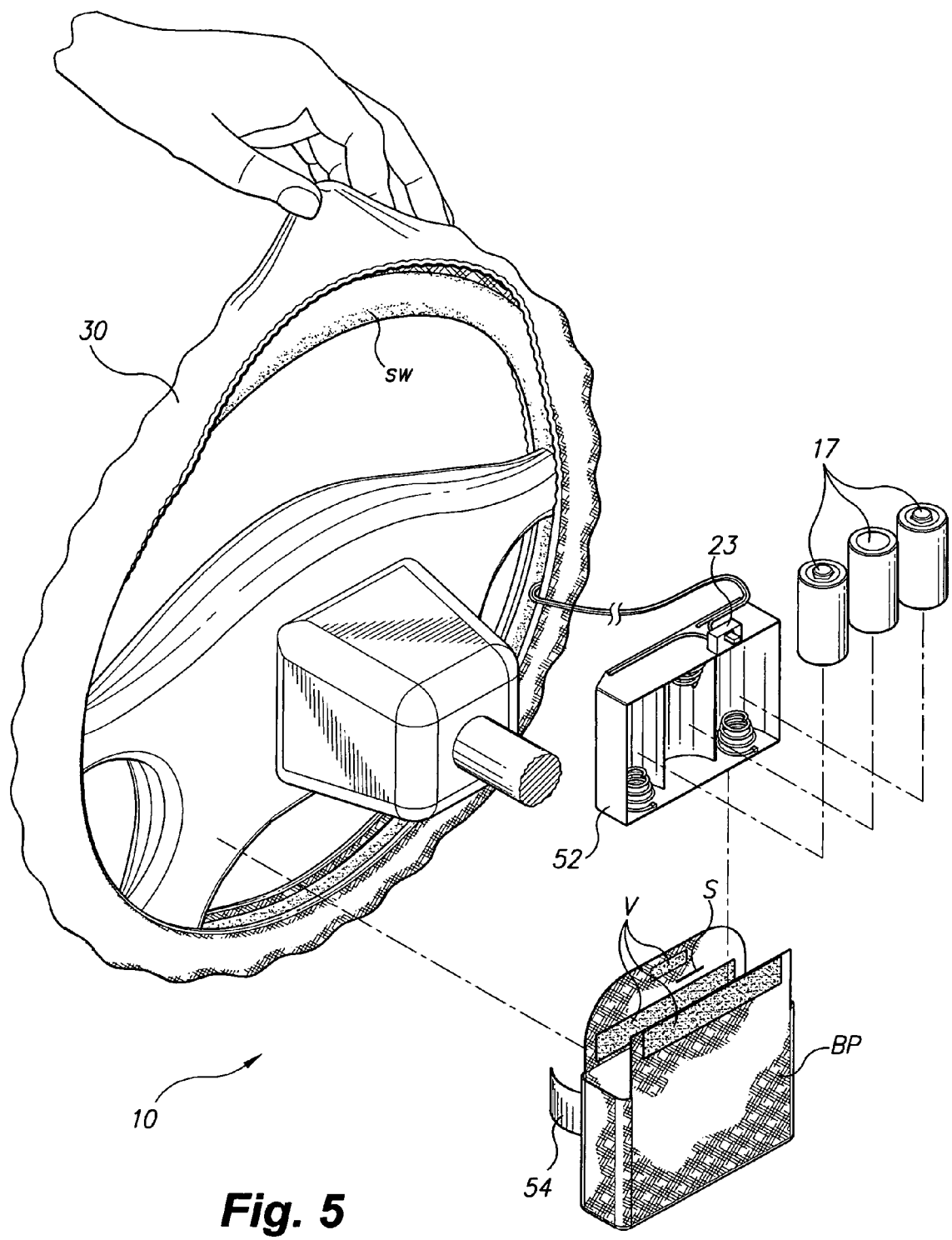
FIG. 5 is an environmental, exploded perspective view of the heated steering wheel cover according to the present invention.

With reference to FIGS. 2 and 5, the heating circuit of inventive steering wheel cover 10 includes a power source, such as, e.g., battery 17 that has a common lead 25 connected to a first end of heating element 21. A hot lead 19 connects to the plus terminal of battery 17 via on-off switch 23 that has a switch contact terminal connected to a second end of heating element 21. When the switch 23 is closed, current from battery 17 flows through heating element 21 thereby producing heat that can warm the cover 10 and thus warm hands that may be in contact with outer surface 30 of the cover 10.

The heating element 21 is preferably a thermoresistive element that produces heat when electricity flows through it. The heating element 21 is also preferably configured to flex with the outer portion 30 and inner portion 40 containing the heating element 21 to reduce the probability of a user encountering any protrusion of the heating element 21 in order to avoid any discomfort to the user's hands resting against the steering wheel cover 10 on a vehicle's steering wheel SW.

As shown in FIG. 2, the circuitry may include an accelerometer activated power switch 100 (preferably mounted within a portion of the heated steering wheel cover 10 so that the heated steering wheel cover 10 is initially powered up when the steering wheel SW is moved by the user. A time-out timer 200 is connected to the accelerometer switch 100 to limit power cycling between periods of steering wheel activity and periods of steering wheel rest, such as, e.g., when a driver momentarily stops at a traffic light and then resumes driving when the light changes. During a longer period of rest, the accelerometer switch 100 will remove power from the heating element 21. The accelerometer switch 100 functions as a cyclic motion-dependent power control element to provide power control and safe operation of the heated steering wheel cover 10. Thus the power from battery 17 is advantageously applied to heating element 21 responsive to motion, e.g., from the driver's manipulating of the steering wheel SW. This ensures the heating element 21 is only active when appropriate; that is, when the driver's hands are actually on the heated steering wheel cover 10 and manipulating the steering wheel SW.

The heating element 21 can be powered by a battery 17, to provide voltage, e.g., 4.5 volts, to the system 10. As shown in FIG. 5, the battery pack BP is comprised of three D sized 1.5 Volt batteries 17 connected to provide a total of 4.5 volts. It should be understood by a person having ordinary skill in the art that any other convenient power source which permits DC power to energize the steering wheel cover heating element 21 is contemplated by the present invention. For example, higher or lower voltage rechargeable batteries may be employed, solar cells may be employed, and the like.

The battery pack BP includes a flexible case having hook and loop fasteners, an elongate fastening strip 54, a battery holder 52 having three D sized battery compartments, switch 23 being attached to the battery holder 52, and three batteries 17, mountable into the compartments of battery holder 52. The battery holder 52 fits inside the flexible case of battery pack BP. Fastening flaps V extend from the case and close over the inserted battery holder 52 to secure the battery holder 52 inside the case. Slits S may be disposed in the case and or flaps V, the slits being provided to fit over the switch 23 thereby exposing the switch 23 for use by the driver in turning the heated steering wheel cover 10 on or off. The elongate fastening can be looped around a portion of the vehicle or steering wheel SW to secure the battery pack BP to the vehicle for safe operation of the heated steering wheel cover 10 during use of the steering wheel SW.

It is to be understood that the present invention is not limited to the embodiment described above, but encompasses any and all embodiments within the scope of the following claims.

I claim:
1. A heated steering wheel cover, comprising:
   a resilient cover having an exterior layer and an interior layer, the resilient cover being removably fittable over a vehicle's steering wheel;
   an electric heating element disposed between the exterior layer and the interior layer, the electric heating element extending laterally from side-to side in a serpentine configuration and extending substantially the entire circumference of the layers; and
   a power-switching accelerometer operable by motion of the steering wheel to activate the electric heating element; and
   a timeout timer operably connected to the power-switching accelerometer, the timeout timer limiting power cycling between periods of steering wheel activity and periods of steering wheel rest,
   wherein when activated, the heating element warms the exterior layer of the cover, thereby warming a driver's hands placed on the heated steering wheel cover.

2. The heated steering wheel cover according to claim 1, further comprising a battery pack attachable to a portion of the vehicle proximate the steering wheel, the battery pack being in operable communication with said power-switching accelerometer to supply power to the heating element.

3. The heated steering wheel cover according to claim 1, wherein said battery pack includes:
   a case;
   a battery holder removably disposed therein;
   at least one battery removably disposed in the battery holder;
   a flap having a fastener, the flap being attached to the case, the fastener retaining the battery holder inside of the case; and
   a fastening strip extending from the case, the fastening strip being adapted for removably securing the battery pack to a portion of the vehicle proximate the steering wheel.

* * * * *